(12) United States Patent  (10) Patent No.: US 7,280,140 B2
Henderson  (45) Date of Patent: Oct. 9, 2007

(54) IMAGE SENSOR READING DURING RESET AND READING ON RELEASE FROM RESET

(75) Inventor: Robert Henderson, Edinburgh (GB)

(73) Assignee: Stmicroelectronics Ltd., Buckinghamshire (GB)

( * ) Notice: Subject to any disclaimer, the term of this patent is extended or adjusted under 35 U.S.C. 154(b) by 641 days.

(21) Appl. No.: 10/405,101

(22) Filed: Apr. 1, 2003

(65) Prior Publication Data
US 2003/0227040 A1 Dec. 11, 2003

(30) Foreign Application Priority Data
Apr. 2, 2002 (EP) .................... 02252403

(51) Int. Cl.
*H04N 5/217* (2006.01)
*H04N 9/64* (2006.01)
(52) U.S. Cl. ...................... 348/241; 348/243
(58) Field of Classification Search ........... 348/241, 348/308, 243
See application file for complete search history.

(56) References Cited

U.S. PATENT DOCUMENTS

| 5,880,460 A | | 3/1999 | Merrill | 250/208 |
| 5,926,214 A | * | 7/1999 | Denyer et al. | 348/241 |
| 6,067,113 A | * | 5/2000 | Hurwitz et al. | 348/241 |
| 6,243,134 B1 | | 6/2001 | Beiley | 348/308 |
| 6,950,131 B1 | * | 9/2005 | Kleinhans et al. | 348/241 |

* cited by examiner

*Primary Examiner*—Vivek Srivastava
*Assistant Examiner*—Nicholas G Giles
(74) *Attorney, Agent, or Firm*—Lisa K. Jorgenson; Allen, Dyer, Dopplet, Milbrath & Gilchrist, P.A.

(57) ABSTRACT

A solid state image sensor has an array of pixels in which each column has a reset voltage line and a read line. The sensor is reset and read a row at a time, with reset-related values held in a frame buffer for subsequent subtraction from read values. Reset-related values are derived in each column by sampling the voltage during reset on one capacitor and the voltage on release of reset on a second capacitor, and differencing these values to provide an output for the frame buffer. This provides a reduction in the size of frame buffer which would otherwise be required.

17 Claims, 3 Drawing Sheets

IMAGE SENSOR READING DURING RESET AND READING ON RELEASE FROM RESET

FIELD OF THE INVENTION

This invention relates to image sensors with an active pixel array, and more particularly to CMOS image sensors.

BACKGROUND OF THE INVENTION

As is well known, one source of noise in active pixel image sensors is thermally generated or kT/C noise, which is generated when the active pixels are released from reset. As pixels are decreased in size, kT/C noise becomes the dominant temporal noise source. A typical 5.6 µm pixel with 3fF capacitance will have kT/C noise of 1.67 mV rms.

European Patent Application 01310582.0 filed Dec. 19, 2001, by the present Assignee, discloses a "double read" system in which reset values for each line and signal values for each line are read out line-by-line and interleaved, with the reset values being held in a frame buffer for later subtraction from corresponding read values. The number of line periods separating the reset and read signals are selectable to control the image exposure. Although this prior approach is effective in reducing noise, it does require a relatively large frame buffer.

SUMMARY OF THE INVENTION

An object of the present invention is to allow a reduction in the size of frame buffer in a double read image sensor system.

The present invention provides a method of operating an image sensor, the image sensor having an array of pixels arranged in rows and columns. The method includes reading reset-related values from the pixels a row at a time and storing these values in a frame buffer, and reading signal-related values from the pixels a row at a time, interleaved with reading of the rows of signal-related values. The reading of the two values for a given row is offset by a number of row periods selected to control the exposure of the image sensor. The method further includes subtracting the reset-related value for each pixel from the signal-related value of the same pixel to give an output signal for that pixel. The reset-related values stored in the frame buffer are produced by differencing two pixel values which are sampled and stored during reset and on release from reset, respectively; and the signal-related values are produced by differencing the pixel values stored during reset and after exposure, respectively.

The present invention is also directed to an image sensor having an array of pixels arranged in rows and columns, with each pixel including a photosensitive element and a switching means/unit to apply a reset voltage to the photosensitive element and to read signal voltages therefrom. The image sensor further includes a timing and storage means/unit to sample and hold pixel values during reset and release from reset, respectively, and a difference circuit arranged to output to a frame buffer the difference between the sampled values as a reset-related value for each pixel.

Preferred features and advantages of the invention will be apparent from the following description.

BRIEF DESCRIPTION OF THE DRAWINGS

An embodiment of the invention will now be described, by way of example only, with reference to the drawings, in which.

DETAILED DESCRIPTION OF THE PREFERRED EMBODIMENTS

Figure 1:
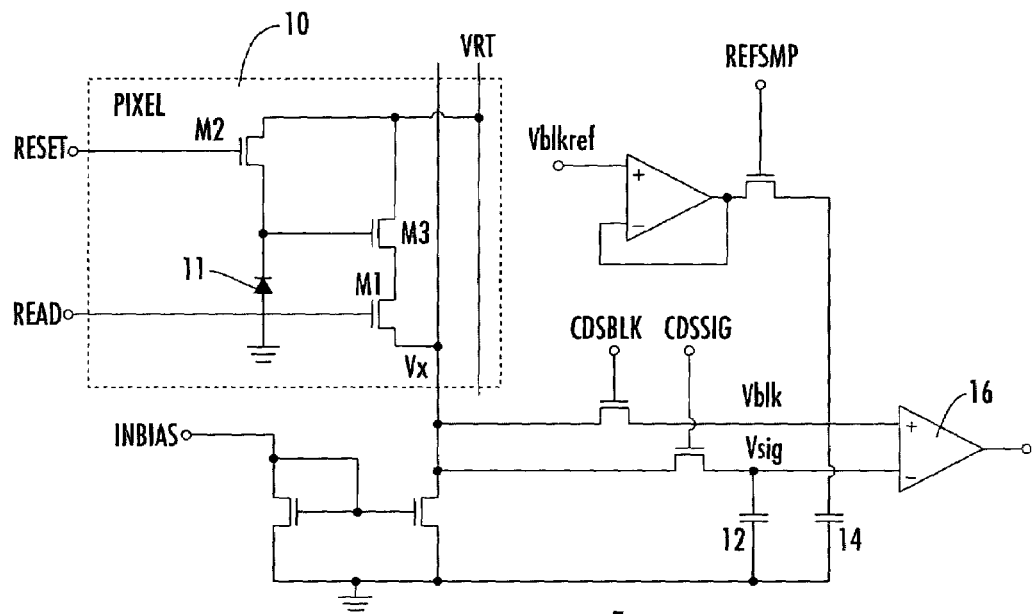
FIG. 1 is a schematic diagram illustrating part of an active pixel image sensor.

Referring to FIG. 1, an image sensor has an array of active pixels, such as 3-transistor pixels one of which is seen at 10, each pixel comprising a photodiode 11 and transistors M1, M2, M3. Each column shares a reset voltage line VRT and a read line Vx. The column has sampling capacitors 12 and 14 connected as inputs to a comparator 16. Alternatively, it is equally possible to make use of horizontal reset voltage lines.

Figure 2:
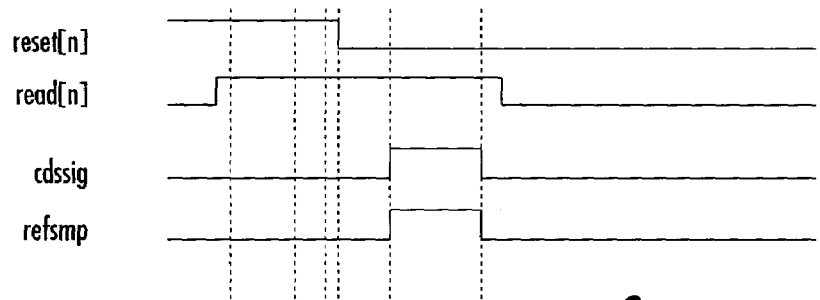
FIGS. 2 and 3 are timing diagrams showing the operation of the circuit of FIG. 1 in a known manner.

FIG. 2 shows the timing of the known double read system. Pixel row n is released from reset by the falling edge of reset[n]. Signals REFSMP and CDSSIG then pulse simultaneously to sample the black reference voltage Vblkref as Vblk and the pixel output voltage is Vsig. The AD conversion processes the sampled differential voltage:

$$Vadc1 = Vblkref - (VRT - Vgsn - Vrst - Vnrst)$$

for each column, where Vgsn is the source follower gate-source voltage and Vnrst is the kT/C noise. The samples Vadc1 are placed in a frame buffer.

Figure 3:
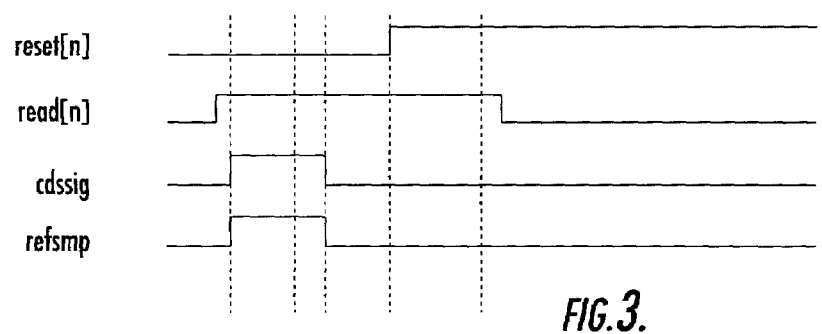

After an exposure time, row n is re-read and the timing is shown in FIG. 3. The pixel is read prior to reset by pulsing REFSMP and CDSSIG simultaneously as before. Vblkref is sample as Vblk and the pixel output voltage is sampled as Vsig. The ADC processes the difference:

$$Vadc2 = Vblkref - (VRT - Vgsn - Vrst - Vnrst - Vsig)$$

The output frame is produced by subtraction Vadc1−Vadc2 for row n yielding the result Vsig. The kT/C noise Vnrst is correlated between the two samples since the pixel row was not reset and so is cancelled by the subtraction.

Frame buffer size is determined by the spread of voltages in Vadc1. In practical sensors with small pixels, the source follower transistors M3 must be small to maintain a large photosensitive area for high efficiency. Vt variation is related to transistor gate area and so the variation of Vgsn due to the source follower devices can be large, up to about 300 mV in a worst case.

Figure 4:
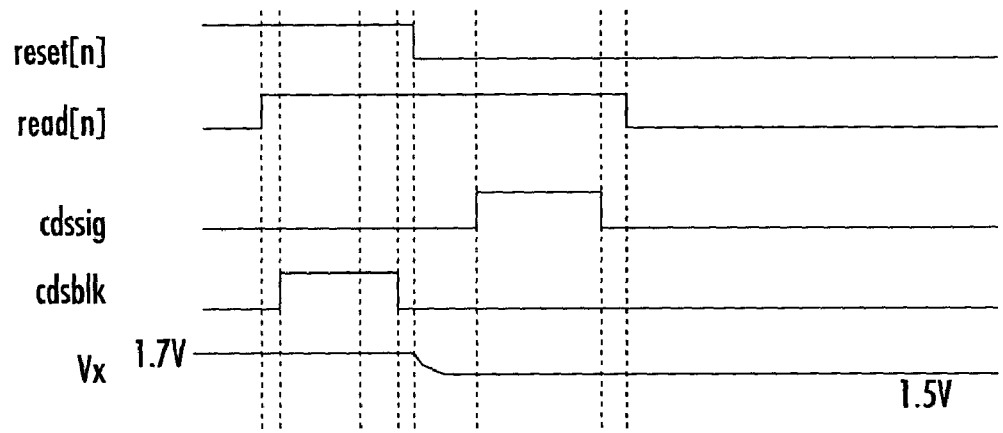
FIGS. 4 and 5 are timing diagrams showing an example of operation of the circuit of FIG. 1 in accordance with the present invention.
Figure 5:
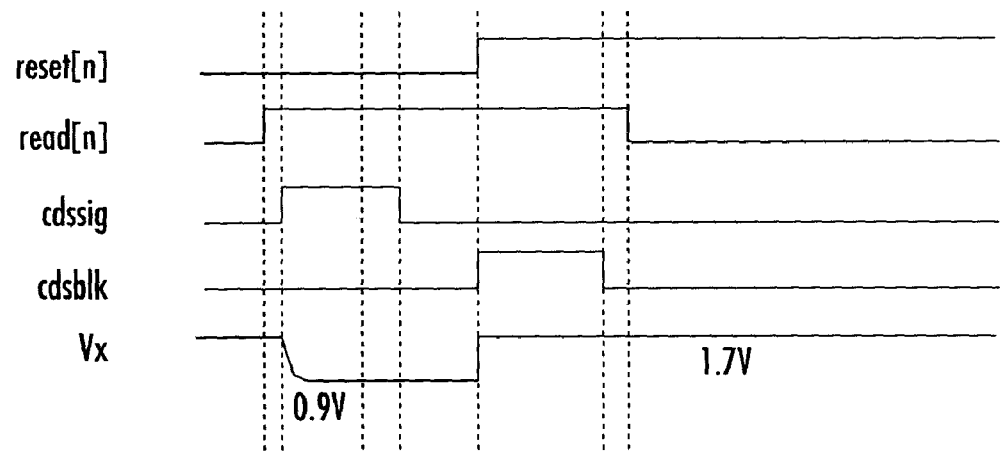

FIGS. 4 and 5 show the reset frame line timing and the signal frame line timing, respectively, in an embodiment of the present invention. During the reset frame CDSBLK pulses while the reset line reset(n) is asserted. The voltage VRT−Vgsn is stored on the Vblk CDS capacitor 14. Subsequently, reset(n) falls and the row of pixels is released from reset. CDSSIG pulses sampling voltage VRT−Vgsn−Vrst−Vnrst on the Vsig capacitor 12 (where Vrst is the charge injection and reset coupling voltage, typically around 300 mV, and Vnrst is the kT/C reset noise). The ADC processes the difference:

$$Vadc1 = VRT - Vgsn - (VRT - Vgsn - Vrst - Vnrst)$$

This result is stored in the frame buffer ready for subsequent subtraction from the signal frame. However, the value that requires to be stored is Vrst+Vnrst which requires no Vgsn distribution, leading to reduced memory requirements for the frame buffer.

Vnrst contains a DC offset due to capacitive coupling between the pixel and the reset(n) line and charge injected from the channel of the reset transistor M2. There is also a random distribution of Vnrst due to parasitic capacitance mismatches and variation of the amount of channel charge of M2 as a result of Vt mismatches. This variation has been determined experimentally to be quite low, around a few mV. The frame buffer must have enough bits to digitize the distribution of Vrst and the noise Vnrst.

After m lines of exposure line n is read again. This time the read sequence is as follows. CDSSIG pulses, sampling VRT−Vgsn−Vrst−Vsig−Vnrst onto the Vsig CDS capacitor 12 (where Vsig is the light-induced signal swing). Subsequently, reset(n) is asserted, resetting the pixel to VRT and then CDSBLK pulses, reading the voltage VRT−Vgsn onto the Vblk CDS capacitor 14. The ADC converts the difference:

Vadc2=VRT−Vgsn−(VRT−Vgsn−Vrst−Vsig−Vnrst)

which gives: Vrst+Vsig+Vnrst.

The results of the two AD conversions are subtracted (Vadc1−Vadc2) to yield the value Vsig. The contributions of Vrst and Vnrst are cancelled.

Note that the Vrst DC contribution can be up to a few 100 mV. By subtracting a fixed DC offset from vblk during sampling, the input range of the AD converter can be reduced. In a single slope column parallel AD converter this means that conversion can be achieved in fewer clock cycles and occupies less line time.

Figure 6:
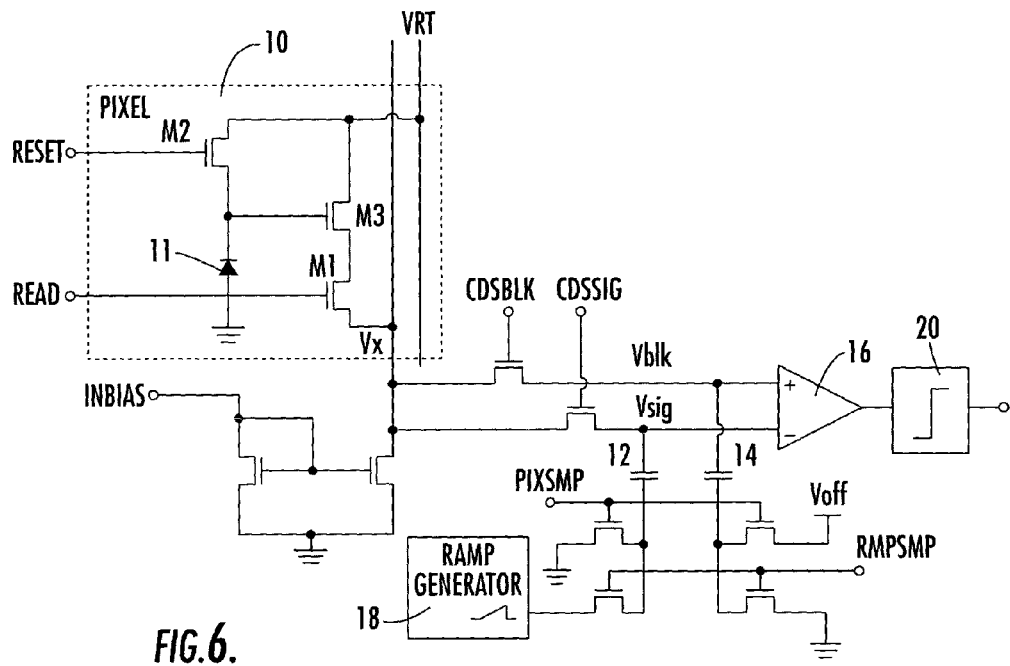
FIG. 6 is a schematic diagram of an image sensor of another embodiment of the present invention.
Figure 7:
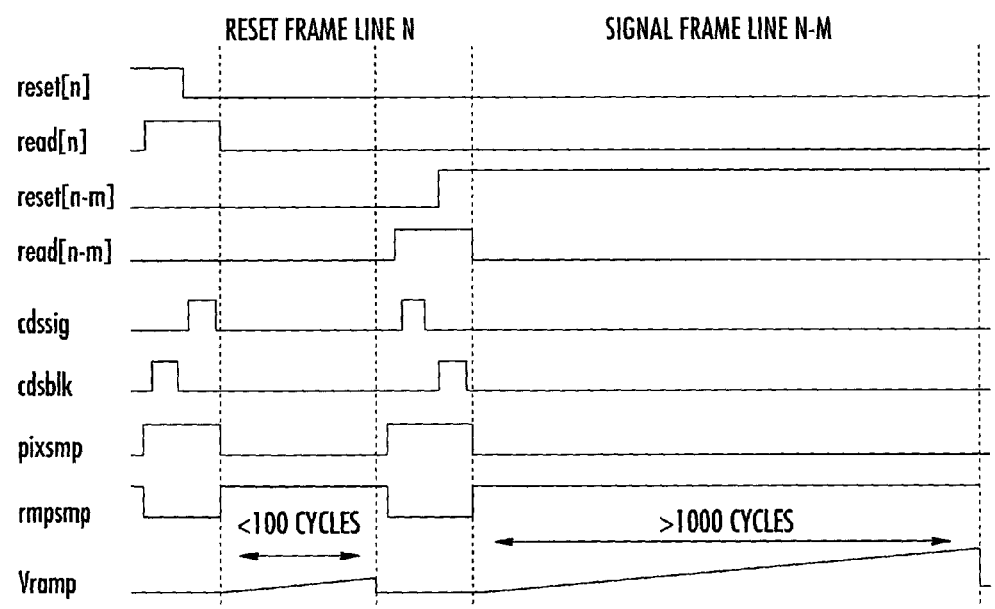
FIG. 7 is a timing diagram for the circuit of FIG. 6.

FIG. 6 shows an example of how this is accomplished, corresponding timings being shown in FIG. 7. Here, a single slope ramp generator 18 is used in conjunction with a comparator output switch 20 to latch a count from a counter (not shown). The signal PIXSMP is asserted during the inter-line period while read(n) is high. The Vblk voltage is sampled with respect to Voff, the DC offset voltage, and the voltage across the capacitor 14 is then (Vblk−Voff). During AD conversion PIXSMP=0 and RMPSMP=1. The bottom plate of capacitor 12 is set to 0 V and the top plate will be at Vblk−Voff. AD conversion proceeds by applying the ramp output of ramp generator 18 to the bottom plate of capacitor 12. When Vsig+Vramp>Vblk−Voff, the comparator 16, 20 changes state and the digital count is latched.

If the voltage Voff is correctly chosen the span of voltage to be converted can be reduced to the extremes of the distributions of Vrst and Vnrst, which is only a few mV. The number of clock cycles over which the ramp generator requires to operate can be reduced to <100. A typical timing for a reset and a signal line can be seen in FIG. 7.

The foregoing scheme is sensitive to noise on the VRT reference voltage; any movement in VRT between the CDSSIG and CDSBLK pulses will introduce line noise in the image. However, an advantage of taking two closely spaced samples from the column is the removal of 1/f noise due to the source follower.

The present invention thus permits a significant reduction in the size of frame buffer required to perform a "double read" operation of a 3-transsitor active pixel array.

That which is claimed is:

1. A method of operating an image sensor, the image sensor having an array of pixels arranged in rows and columns, each pixel having a source-follower transistor and a reset voltage line, the method comprising:
    reading on reset a first sample value from the reset voltage line equal to a reset voltage less a gate-source voltage of the source-follower transistor, and reading on release from reset a second sample value equal to the first sample value less the sum of a charge injection voltage, a reset coupling voltage, and a thermal noise voltage, the first and second sample values corresponding to a first set of pixel values and being read onto respective sample capacitors from the pixels row-by-row;
    differencing the first set of pixel values to create reset-related values which are equal to the sum of the charge injection voltage, the reset coupling voltage, and the thermal noise voltage, and storing the reset-related values in a frame buffer;
    reading after exposure a third sample value equal to the second sample value less an exposure induced voltage change, and reading during reset a fourth sample value equal to the first sample value, the third and fourth sample values corresponding to a second set of pixel values and being read onto respective sample capacitors from the pixels row-by-row, interleaved with the reading of the first set of pixel values, and differencing the second set of pixel values to create signal related values which are equal to the sum of the charge injection voltage, the reset coupling voltage, the thermal noise voltage, and the exposure induced voltage change;
    the reading of said first and second sets of pixel values for a given row being offset by a number of row periods selected to control exposure of the image sensor; and
    subtracting the respective reset-related value for each pixel from the respective signal-related value of each pixel to provide the exposure induced voltage change as an output signal for the pixel.

2. The method of claim 1, wherein the differencing comprises reducing an effect of the gate-source voltage from the stored pixel values.

3. The method of claim 1, further comprising subtracting a DC offset voltage from a black reference voltage during sampling.

4. A method of operating an image sensor, the image sensor having an array of pixels arranged in rows and columns, each pixel having a source-follower transistor and a reset voltage line, the method comprising:
    reading during reset a first sample value from the reset voltage line equal to a reset voltage less a gate-source voltage of the source-follower transistor, and reading on release from reset a second sample value equal to the first sample value less the sum of a charge injection voltage, a reset coupling voltage, and a thermal noise voltage, the first and second sample values corresponding to a first set of pixel values and being read onto respective sample capacitors;
    differencing the first set of pixel values to generate reset-related values which are equal to the sum of the charge injection voltage, the reset coupling voltage, and the thermal noise voltage; and
    storing the reset-related values in a frame buffer.

5. The method of claim 4, further comprising:
    reading after exposure a third sample value equal to the second sample value less an exposure induced voltage change, reading during reset a fourth sample value equal to the first sample value, the third and fourth sample values corresponding to a second set of pixel values and being read onto respective sample capacitors;

differencing the second set of pixel values to generate read values which are equal to the sum of the charge injection voltage, the reset coupling voltage, the thermal noise voltage, and the exposure induced voltage change; and subtracting the respective reset-related value for each pixel from the respective read value of each pixel to provide the exposure induced voltage change as an output signal for the pixel.

6. The method of claim 4, wherein the differencing comprises reducing an effect of a the gate source voltage from the stored pixel values.

7. The method of claim 4, further comprising subtracting a DC offset voltage from a black reference voltage during sampling.

8. An image sensor comprising:

an array of pixels arranged in rows and columns, each pixel comprising a photosensitive element, a source-follower transistor coupled to the photosensitive element, and switching means for applying a reset voltage to the photosensitive element and for reading signal voltages therefrom;

a pair of sample capacitors;

reading means for reading a first sample value equal to the reset voltage less a gate-source voltage of the source-follower transistor, and a second sample value equal to the first sample value less the sum of a charge injection voltage, a reset coupling voltage, and a thermal noise voltage, during reset and release from reset, respectively, the first and second sample values corresponding to a first set of pixel values and being read onto respective sample capacitors;

a frame buffer; and a difference circuit to difference the first set of pixel values to create a reset-related value, and to output to the frame buffer, the reset-related value for each pixel.

9. An image sensor according to claim 8, wherein the reading means reads a third sample value equal to the second sample value less an exposure induced voltage change and a fourth sample value equal to the first sample value, during reset and after exposure, respectively, the third and fourth sample values corresponding to a second set of pixel values and being read onto respective sample capacitors, and the second set of pixel values are differenced by the difference circuit to generate a signal-related value for each pixel which is equal to the sum of the charge injection voltage, the reset coupling voltage, the thermal noise voltage, and the exposure induced voltage change; and further comprising subtracting means for subtracting respective reset-related values in the frame buffer from respective signal-related values for each pixel.

10. An image sensor according to claim 8, further comprising a pair of switches, each column of the array of pixels including a readout line connectable by the pair of switches to the pair of sample capacitors; and wherein the pair of sample capacitors defines an input to said difference circuit.

11. An image sensor according to claim 10, further comprising means for applying a DC offset voltage to one of said sample capacitors.

12. An image sensor according to claim 11, further comprising a ramp generator to apply a ramp voltage to the other sample capacitor.

13. An image sensor comprising:

an array of pixels arranged in rows and columns, each pixel comprising a photosensitive element, a source-follower transistor coupled to the photosensitive element, and a switching circuit to apply a reset voltage to the photosensitive element and to read signal voltages therefrom;

a pair of sample capacitors;

a read circuit to read a first sample value equal to a reset voltage less a gate-source voltage of the source-follower transistor, and a second sample value equal to the first sample value less the sum of a charge injection voltage, a reset coupling voltage, and a thermal noise voltage, during reset and release from reset, respectively, the first and second sample values corresponding to a first set of pixel values and being read onto respective sample capacitors;

a frame buffer; and a difference circuit to difference the first set of pixel values to create and output reset-related values for each pixel to the frame buffer.

14. An image sensor according to claim 13, wherein the read circuit also reads a third sample value equal to the second sample value less an exposure induced voltage change and a fourth sample value equal to the first sample value, during reset and after exposure, respectively, the third and fourth sample values corresponding to a second set of pixel values and being read onto respective sample capacitors, and the second set of pixel values are differenced by the difference circuit to generate a signal-related value for each pixel which is equal to the sum of the charge injection voltage, the reset coupling voltage, the thermal noise voltage, and the exposure induced voltage change; and further comprising a subtracting circuit for subtracting respective reset-related values in the frame buffer from respective signal-related values for each pixel.

15. An image sensor according to claim 13, further comprising a pair of switches, each column of the array of pixels including a readout line connectable by the pair of switches to the pair of sample capacitors; wherein the pair of sample capacitors defines an input to said difference circuit.

16. An image sensor according to claim 15, further comprising a DC offset circuit to apply a DC offset voltage to one of said sample capacitors.

17. An image sensor according to claim 16, further comprising a ramp generator to apply a ramp voltage to the other sample capacitor.

* * * * *

UNITED STATES PATENT AND TRADEMARK OFFICE
CERTIFICATE OF CORRECTION

PATENT NO. : 7,280,140 B2 Page 1 of 1
APPLICATION NO. : 10/405101
DATED : October 9, 2007
INVENTOR(S) : Robert Henderson It is certified that error appears in the above-identified patent and that said Letters Patent is hereby corrected as shown below:

| | |
|---|---|
| On The Title Page Item (73) | Delete: "Stmicroelectronics" <br> Insert: -- STMicroelectronics -- |
| On The Title Page Item (74) | Delete: "Dopplet" <br> Insert: -- Doppelt -- |
| Column 3, Line 33 | Delete: "vblk" <br> Insert: -- Vblk -- |
| Column 3, Line 67 | Delete: "transsitor" <br> Insert: -- transistor -- |
| Column 4, Line 67 | Delete: "change, reading" <br> Insert: -- change, and reading -- |
| Column 5, Line 15 | Delete: "of a the gate source" <br> Insert: -- of the gate-source -- |

Signed and Sealed this

Tenth Day of June, 2008

JON W. DUDAS
*Director of the United States Patent and Trademark Office*